United States Patent
Beauchamp

(10) Patent No.: US 8,626,991 B1
(45) Date of Patent: Jan. 7, 2014

(54) MULTI-LUN SSD OPTIMIZATION SYSTEM AND METHOD

(75) Inventor: Robert W. Beauchamp, Littleton, MA (US)

(73) Assignee: EMC Corporation, Hopkinton, MA (US)

(*) Notice: Subject to any disclaimer, the term of this patent is extended or adjusted under 35 U.S.C. 154(b) by 132 days.

(21) Appl. No.: 13/174,639

(22) Filed: Jun. 30, 2011

(51) Int. Cl.
*G11C 16/10* (2006.01)
*G06F 12/02* (2006.01)

(52) U.S. Cl.
USPC .................. 711/103; 711/154; 711/E12.008; 711/E12.009; 707/693

(58) Field of Classification Search
None
See application file for complete search history.

(56) References Cited

U.S. PATENT DOCUMENTS

| | | | | |
|---|---|---|---|---|
| 6,850,443 B2* | 2/2005 | Lofgren et al. | ............... | 365/218 |
| 7,188,228 B1* | 3/2007 | Chang et al. | .................. | 711/202 |
| 7,552,272 B2* | 6/2009 | Gonzalez et al. | ............. | 711/103 |
| 2003/0172149 A1* | 9/2003 | Edsall et al. | .................. | 709/224 |
| 2004/0083335 A1* | 4/2004 | Gonzalez et al. | ............. | 711/103 |
| 2005/0281095 A1* | 12/2005 | Eilert et al. | ............... | 365/189.12 |
| 2006/0106972 A1* | 5/2006 | Gorobets et al. | ............. | 711/103 |
| 2006/0161725 A1* | 7/2006 | Lee et al. | ........................ | 711/103 |
| 2007/0233931 A1* | 10/2007 | Tanaka et al. | ...................... | 711/5 |
| 2008/0147964 A1* | 6/2008 | Chow et al. | ................... | 711/103 |
| 2008/0155183 A1* | 6/2008 | Zhuang et al. | ................ | 711/103 |
| 2008/0297199 A1* | 12/2008 | Grunzke | .................. | 365/189.11 |
| 2009/0168525 A1* | 7/2009 | Olbrich et al. | ................ | 365/191 |
| 2009/0172257 A1* | 7/2009 | Prins et al. | ..................... | 711/103 |
| 2009/0259797 A1* | 10/2009 | Meir | .............................. | 711/103 |
| 2010/0153620 A1* | 6/2010 | McKean et al. | ................ | 711/103 |
| 2011/0078496 A1* | 3/2011 | Jeddeloh | ....................... | 714/6.24 |
| 2011/0161553 A1* | 6/2011 | Saxena et al. | .................. | 711/103 |
| 2011/0299317 A1* | 12/2011 | Shaeffer et al. | ............... | 365/106 |
| 2012/0284587 A1* | 11/2012 | Yu et al. | ........................ | 711/103 |

OTHER PUBLICATIONS

KingMax. "SuperStick (USB 2.0) Specification." Version 1.0. Sep. 23, 2008.*
Werner, Jeremy. "A Look Under the Hood at Some Unique SSD Features." Flash Memory Summit 2010. Santa Clara, Calif. Aug. 2010. Retrieved Jul. 8, 2011. <http://www.bswd.com/FMS10/FMS10-Werner.pdf>.*
Feng Chen et al. "Essential roles of exploiting internal parallelism of flash memory based solid state drives in high-speed data processing." IEEE 17th International Symposium on High Performance Computer Architecture (HPCA 2011), Feb. 12, 2011, pp. 266-277.*
Park et al. ("CFLRU: A Replacement Algorithm for Flash Memory." CASES '06: Proceedings of the 2006 international conference on Compilers, Architecture and Synthesis for Embedded Systems. ACM, Oct. 2006.*
"USB Flash Wear-Leveling and Life Span: Frequently Asked Questions." Corsair, Jun. 2007.*

(Continued)

*Primary Examiner* — Matthew Bradley
*Assistant Examiner* — Daniel Bernard
(74) *Attorney, Agent, or Firm* — Brian J. Colandreo; Mark H. Whittenberger; Holland & Knight LLP

(57) ABSTRACT

A method, computer program product, and computing system for dividing a physical memory device into at least a first logical memory device and a second logical memory device. The physical memory device includes a plurality of physical memory elements. A first portion of the plurality of physical memory elements is assigned to the first logical memory device. A second portion of the plurality of physical memory elements is assigned to the second logical memory device.

18 Claims, 5 Drawing Sheets

(56) References Cited

OTHER PUBLICATIONS

Perdue, Ken. "Application Note: Wear Leveling," Rev. 01. Spansion, Apr. 30, 2008.*

"Wear Leveling: Extended Product Lifespan." Apacer Technology, Inc., 2010. Retrieved Apr. 26, 2011. <http://web.archive.org/web/20110426211246/http://us.apacer=.com/business/technology/wear-leveling>.*

* cited by examiner

MULTI-LUN SSD OPTIMIZATION SYSTEM AND METHOD

TECHNICAL FIELD

This disclosure relates to solid-state storage devices and, more particularly, to wear-leveling solid-state storage devices.

BACKGROUND

Solid-state storage devices (such as flash memory devices) have a downside in that the storage device is degraded each time that data is written to it. Specifically, each storage cell within the solid-state storage device can typically only be written to approximately 10,000 times and then it may no longer work.

Accordingly, wear-leveling methodologies are often employed to move data around to wear out the entire storage device simultaneously. These devices usually utilize extra "hidden" storage capacity (i.e. over-provisioning space) so that data may be swapped into these "hidden" areas to increase the likelihood of more uniform wear and to also allow the solid-state storage device to maintain its rated capacity even after the individual storage cells begin to fail. Typically the extra "hidden" storage capacity (i.e. the over-provisioning space) is a fairly significant amount (e.g., 40% to the total capacity). Accordingly, a 500 gigabyte drive may have approximately 200 gigabytes of extra "hidden" storage capacity available for swapping.

Often, solid-state storage technology is used in memory vaulting applications. As is known in the art, memory vaulting is the process of storing a "snapshot" of the content of volatile memory at the time of a power/system failure. Accordingly, once the power/system is restored, the volatile memory may be repopulated with the data included within the snapshot and the system associated with the volatile memory may resume functioning as it had just prior to the power/system failure. Accordingly, through the memory vaulting process, the impact associated with a power/system failure may be reduced, as the impacted system may quickly return to functionality once the power/system failure is rectified.

As memory vaulting only occurs during a power/system failure event, the individual storage cells included within the solid-state storage device used for memory vaulting are essentially only written to and read from once for each power/system failure event. Accordingly and due to such a low quantity of write operations, such memory vaulting systems exhibit disproportionately little wear when compared to other portions of the solid-state storage device that may be perform tasks that exhibit much greater wear (e.g., cache storage).

SUMMARY OF DISCLOSURE

In a first implementation, a computer-implemented method includes dividing a physical memory device into at least a first logical memory device and a second logical memory device. The physical memory device includes a plurality of physical memory elements. A first portion of the plurality of physical memory elements is assigned to the first logical memory device. A second portion of the plurality of physical memory elements is assigned to the second logical memory device.

One or more of the following features may be included. A first physical memory element included within the first portion of the plurality of physical memory elements may be traded with a second physical memory element included within the second portion of the plurality of physical memory elements to promote wear leveling across the physical memory device. One or more of the first physical memory element and/or the second physical memory element may be chosen from the group consisting of: a high-wear functioning physical memory element, a low-wear functioning physical memory element, and a failed physical memory element. Dividing the physical memory device into at least a first logical memory device and a second logical memory device may include dividing the physical memory device into at least one additional logical memory device; and assigning an additional portion of the plurality of physical memory elements to the at least one additional logical memory device. The physical memory device may be a flash memory device. The physical memory element may be a physical erase-block. The physical erase-block may include a plurality of physical memory pages.

In another implementation, a computer program product resides on a computer readable medium and has a plurality of instructions stored on it. When executed by a processor, the instructions cause the processor to perform operations including dividing a physical memory device into at least a first logical memory device and a second logical memory device. The physical memory device includes a plurality of physical memory elements. A first portion of the plurality of physical memory elements is assigned to the first logical memory device. A second portion of the plurality of physical memory elements is assigned to the second logical memory device.

One or more of the following features may be included. A first physical memory element included within the first portion of the plurality of physical memory elements may be traded with a second physical memory element included within the second portion of the plurality of physical memory elements to promote wear leveling across the physical memory device. One or more of the first physical memory element and/or the second physical memory element may be chosen from the group consisting of: a high-wear functioning physical memory element, a low-wear functioning physical memory element, and a failed physical memory element. Dividing the physical memory device into at least a first logical memory device and a second logical memory device may include dividing the physical memory device into at least one additional logical memory device; and assigning an additional portion of the plurality of physical memory elements to the at least one additional logical memory device. The physical memory device may be a flash memory device. The physical memory element may be a physical erase-block. The erase-block may include a plurality of physical memory pages.

In another implementation, a computing system includes at least one processor and at least one memory architecture coupled with the at least one processor. A first software module is executed on the at least one processor and the at least one memory architecture. The first software module is configured to perform operations including dividing a physical memory device into at least a first logical memory device and a second logical memory device. The physical memory device includes a plurality of physical memory elements. A second software module is executed on the at least one processor and the at least one memory architecture. The second software module is configured to perform operations including assigning a first portion of the plurality of physical memory elements to the first logical memory device. A third software module is executed on the at least one processor and the at least one memory architecture. The third software module is configured to perform operations including assigning a second portion of the plurality of physical memory elements to the second logical memory device.

One or more of the following features may be included. A first physical memory element included within the first portion of the plurality of physical memory elements may be traded with a second physical memory element included within the second portion of the plurality of physical memory elements to promote wear leveling across the physical memory device. One or more of the first physical memory element and/or the second physical memory element may be chosen from the group consisting of: a high-wear functioning physical memory element, a low-wear functioning physical memory element, and a failed physical memory element. Dividing the physical memory device into at least a first logical memory device and a second logical memory device may include dividing the physical memory device into at least one additional logical memory device; and assigning an additional portion of the plurality of physical memory elements to the at least one additional logical memory device. The physical memory device may be a flash memory device. The physical memory element may be a physical erase-block. The physical erase-block may include a plurality of physical memory pages.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
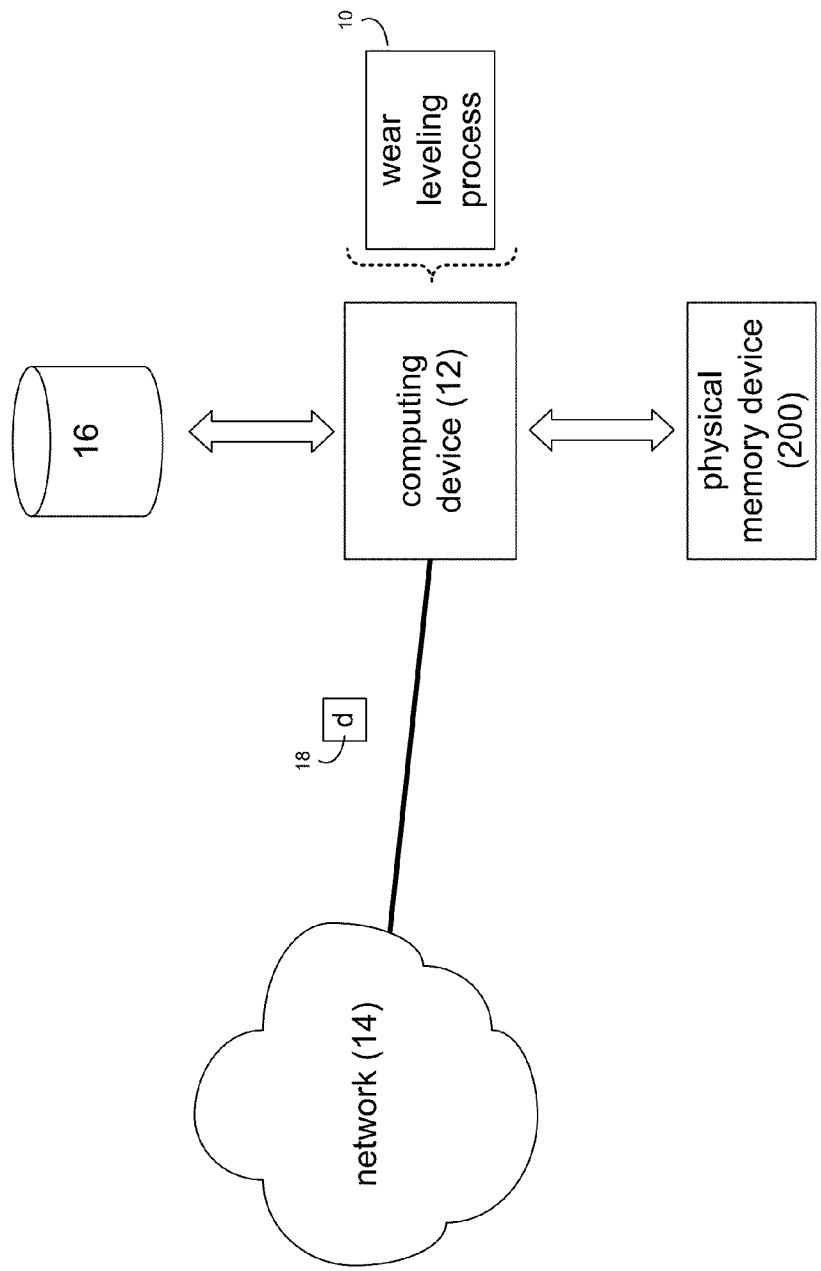
FIG. 1 is a diagrammatic view of a computing device and a wear-leveling process.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown wear-leveling process 10 that may reside on and may be executed by all or a portion of computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a server computer, a series of server computers, a mini computer, a mainframe computer, a dedicated network device, a Network Attached Storage (NAS) system, and a Storage Area Network (SAN).

As is known in the art, a SAN may include one or more of a personal computer, a server computer, a series of server computers, a mini computer, a mainframe computer, a RAID array and an NAS. Computing device 12 may execute one or more operating systems (which may be stored on storage device 16), examples of which may include but are not limited to: Microsoft Windows™; Redhat Linux™, Unix, or a custom operating system, for example. Storage device 16 may include but is not limited to: a hard disk drive; a tape drive; an optical drive; a RAID array; a random access memory (RAM); a read-only memory (ROM); and flash memory.

Figure 2:
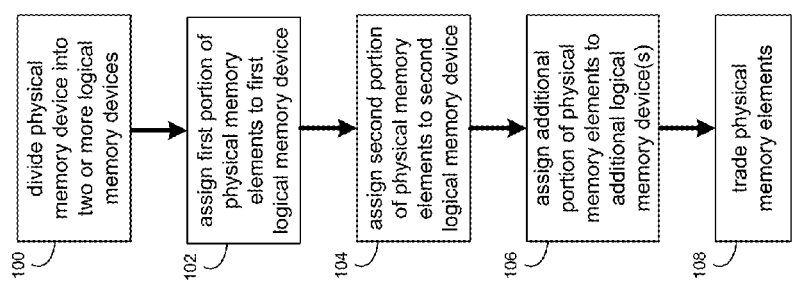
FIG. 2 is a flowchart of the wear-leveling process of FIG. 1.
Figure 3:
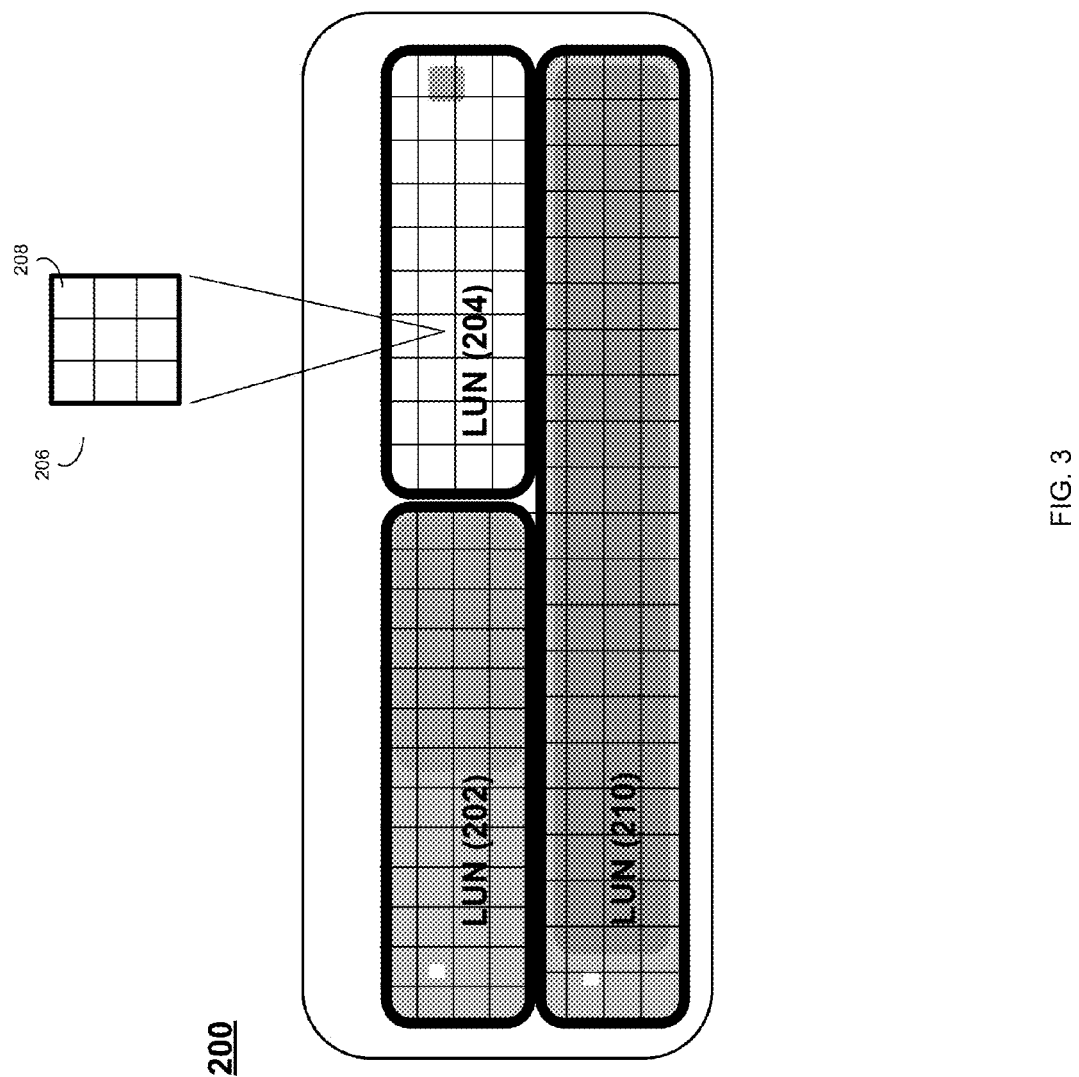
FIG. 3 is a diagrammatic view of a physical memory device that executes the wear-leveling process of FIG. 1.

Referring also to FIGS. 2 & 3 and as will be discussed below in greater detail, wear-leveling process 10 may divide 100 a physical memory device (e.g., physical memory device 200) into at least a first logical memory device (e.g., LUN 202) and a second logical memory device (e.g., LUN 204). Physical memory device 200 may include a plurality of physical memory elements. A first portion of the plurality of physical memory elements may be assigned to the first logical memory device (e.g., LUN 202). A second portion of the plurality of physical memory elements may be assigned to the second logical memory device (e.g., LUN 204).

The instruction sets and subroutines of wear-leveling process 10, which may be stored within physical memory device 200, may be executed by one or more processors (not shown) and one or more memory architectures (not shown) included within physical memory device 200.

The Wear-Leveling Process:

During operation of computing device 12, one or more data portions (e.g. data portion 18) may be processed by computing device 12. For example, data portion 18 may be received from network 14 by computing device 12 for processing. Or data portion 18 may be transmitted from computing device 12 to network 14. Alternatively, data portion 18 may be generated and stored within computing device 12. Accordingly, data portion 18 may be stored upon and retrieved from physical memory device 200.

As discussed above, wear-leveling process 10 may divide 100 physical memory device 200 into at least two logical memory devices (e.g., LUN 202 & LUN 204). As is known in the art, a LUN (Logical Unit Number) is a logical storage device that may be defined as a portion of one or more physical memory devices. One example of physical memory device 200 may include but is not limited to a flash memory device (such as a flash disk drive).

As is known in the art, memory devices (e.g., physical memory device 200) may be physically organized in a two-level hierarchy that includes "physical memory pages" at the lower level, and "physical erase-blocks" at the higher level. While the sizes of these two entities vary across generations of storage devices, a typical nominal value is approximately 4 KB for a physical memory page, with 256 physical memory pages included within each physical erase-block.

With respect to flash memory devices, flash memory devices may provide the ability to randomly read any physical memory page included within the device. While flash memory devices may also be written in pages, there are some limitations. For example, the physical memory page to be written to within the flash memory device must be in an erased state. And the erasing process can only be performed on an entire physical erase-block. Additionally, the physical memory pages within a physical erase-block may only be written to in sequential order. And as discussed above, the number of erase operations that a physical erase-block may endure without failing is limited and must therefore be managed to approximately even the wear across all physical erase-blocks to enhance the lifespan of the flash memory device.

Accordingly, physical memory device 200 may include a plurality of physical memory elements. One example of such a physical memory element may include but is not limited to physical erase-block 206. And as discussed above, physical erase-block 206 may include a plurality of physical memory pages (e.g., physical memory page 208).

While the system is described above as having wear-leveling process 10 divide 100 physical memory device 200 into two logical memory devices (e.g. LUN 202 and LUN 204), this is for illustrative purposes only and is not intended to be a limitation of this disclosure. For example, wear-leveling process 10 may divide 100 physical memory device 200 into one or more additional logical memory devices (e.g., LUN 210) and an additional portion of the plurality of physical memory elements included within physical memory device 200 may be assigned 106 to the additional logical memory device(s).

Figure 4:
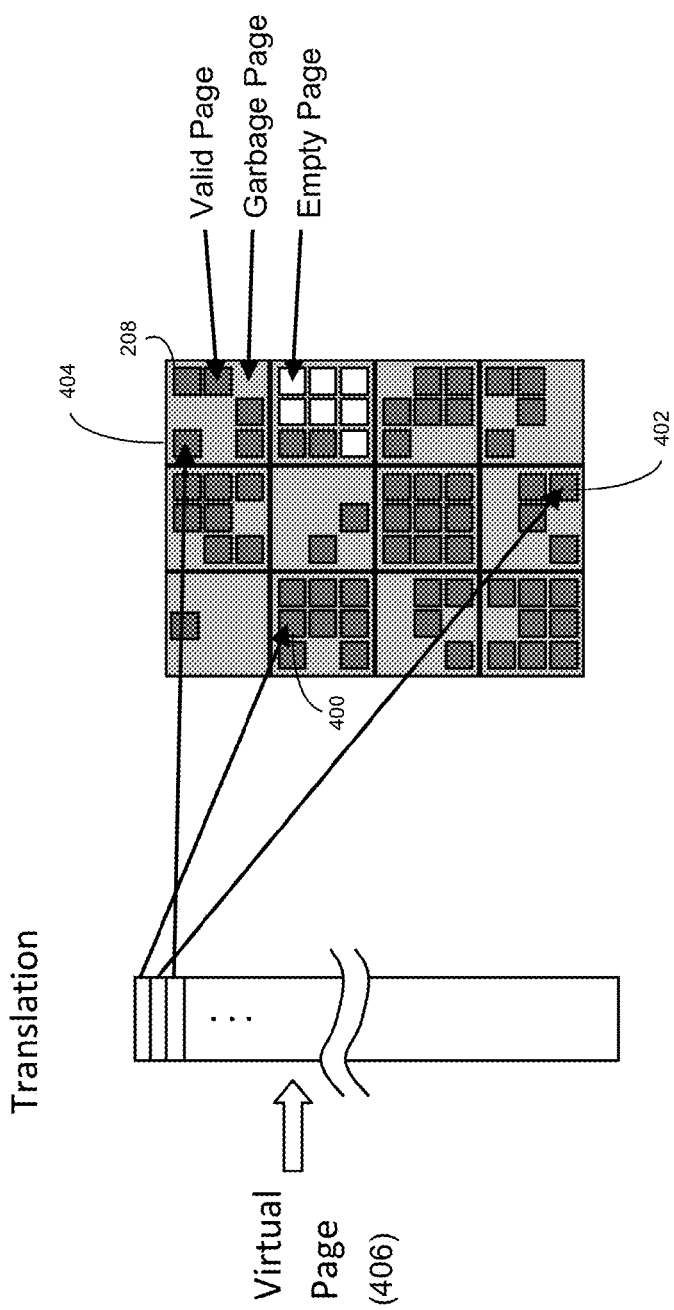
FIG. 4 is a diagrammatic view of a portion of the physical memory device of FIG. 3.

Referring also to FIG. 4 and as is known in the art, memory devices (e.g., physical memory device 200) may "virtualize" physical memory pages (e.g., physical memory pages 400, 402, 404) into a smaller number of virtual memory pages (e.g., virtual page 406) in order to provide higher-performance write capabilities. For example, a mapping layer may be used to allow random virtual page writes to be written to sequential physical memory pages. During such operations, the previous physical location of the virtual page is marked as garbage (i.e., unneeded/disposable data). After operating in this fashion across the entire virtual page space for a sufficient period of time, the virtual pages are typically distributed across all of the physical erase-blocks and the average percent of valid space within a physical erase-block may be e.g., the ratio of the virtual page space capacity to the total physical page space capacity of the memory device.

Figure 5:
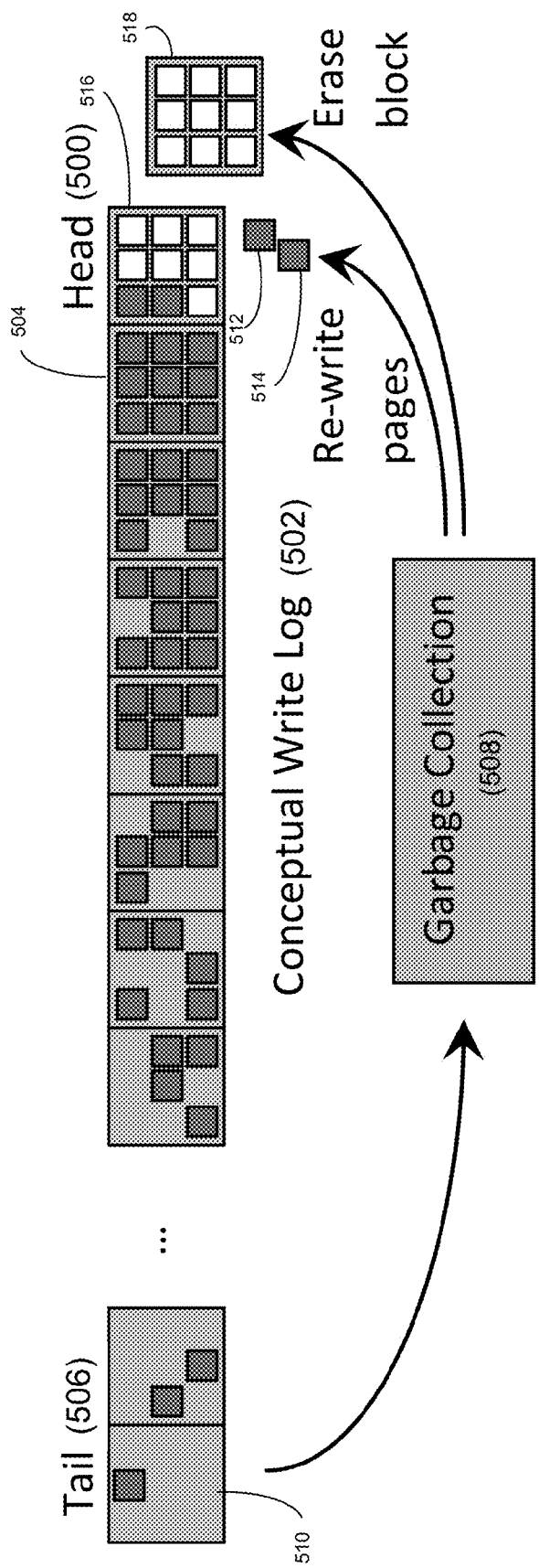
FIG. 5 is a diagrammatic view of a portion of the physical memory device of FIG. 3.

Referring also to FIG. 5, the use of physical memory space may be conceptualized as a write log. New data may be written to head 500 of log 502 and, therefore, written erase-blocks (e.g., erase-block 504) at head 500 may tend to be fully utilized (i.e., the physical pages will contain currently valid virtual pages). As erase-blocks are examined closer and closer to tail 506 of log 502, these erase-blocks may tend to be less utilized (since the virtual pages that were originally mapped to these older erase-blocks are more likely to have been re-written).

As discussed above, a physical memory page to be written to must be in an erased state, and erasing can only be performed on an entire physical erase-block. Accordingly, in order to provide an erased physical erase-block when required for head 500, a background task (commonly referred to as garbage collector process 508) may select a candidate erase-block (e.g., erase block 510), read any valid pages it contains (e.g., physical pages 512, 514), re-write those pages elsewhere (e.g., to erase-block 516), and finally erase the block (e.g., to produce erased erase-block 518).

When deciding which of the available erase-blocks to process, garbage collection process 508 may consider various objectives, such as: 1) choosing the least utilized erase-block, 2) choosing the least worn erase-block, and 3) minimizing the amount of computation to make the choice. Traditionally, garbage collection process 508 may have an empty block available when needed, and may only generate empty blocks as fast as they are consumed.

Often when a physical memory device is deployed, there will be a need to divide the capacity of e.g., physical memory device 200 into multiple subset capacities that e.g., may be used by independent applications. Accordingly and as discussed above, wear-leveling process 10 may divide 100 physical memory device 200 into at least two logical memory devices (e.g., LUN 202 & LUN 204). Further, wear-leveling process 10 may assign 102 a first portion of the plurality of physical memory elements included within physical memory device 200 to a first logical memory device (e.g., LUN 202). Additionally, wear-leveling process 10 may assign 104 a second portion of the plurality of physical memory elements included within physical memory device 200 to the second logical memory device (e.g., LUN 204). Accordingly, when dividing 100 the logical page space of physical memory device 200 to construct e.g., LUN 202 & LUN 204, wear-leveling process 10 may assign 102, 104 the physical erase-block space in accordance with the division of the logical page space.

When associating logical storage space within a LUN to physical page space within physical memory device 200, the ratio of logical storage space to physical page space need not be one-to-one. For example, a quantity of logical storage space within the LUN may be associated with a larger quantity of physical page space within physical memory device 200. Such an over-ratio situation may be desirable for various reasons, such as write amplification and over-provisioning.

Conversely, a quantity of logical storage space within a LUN may be associated with a smaller quantity of physical page space within physical memory device 200. Such an under-ratio situation may be desirable when e.g., the logical storage space in sparely populated (such as when the logical storage space is used as a hash table).

An additional benefit of the above-stated configuration is the ability of a given LUN to ensure its physical capacity may be in a pre-erased state independent of the activity and state of the other LUNs. Specifically, since physical memory device 200 is divided 100 to construct the logical page space of e.g., LUN 202 & LUN 204, the physical page space is not shared. Accordingly, each LUN is free to manipulate (e.g., pre-erase) its assigned physical page space as the LUN deems appropriate.

To effectuate wear leveling, wear-leveling process 10 may trade 108 specific erase-blocks between the various sub-device erase-block pools. However, the number of erase-blocks included within each sub-device erase-block pool will be preserved by wear-leveling process 10.

Specifically, wear-leveling process 10 may trade 106 a first physical memory element included within the first portion of the plurality of physical memory elements with a second physical memory element included within the second portion of the plurality of physical memory elements.

For example, assume for illustrative purposes that LUN 202 is used as a cache memory device and LUN 204 is used as a vaulting device. Accordingly, the erase-blocks included within LUN 202 would wear at a rate much greater than the erase-blocks included within LUN 204. Accordingly, as individual erase-blocks included within LUN 202 start to wear, wear-leveling process 10 may trade 106 these worn erase-blocks included within LUN 202 for less worn erase-blocks included within LUN 204. However and as stated above, wear-leveling process 10 will maintain the original quantities of erase-blocks included within each of the LUNs. Accordingly, by effectuating such trades, wear leveling process 10 may effectuate a more even wearing of the erase-blocks included in all of the LUNs included within physical memory device 200.

Further, in the event of a failure of an erase-block, wear-leveling process 10 may remove the failed erase-block from the operational pool of the appropriate LUN. However, in a fashion similar to wear-leveling of the individual erase-blocks, wear-leveling process 10 may trade failed erase-blocks included within a first LUN (e.g. LUN 202) for a functioning erase-block included within a second LUN (e.g. LUN 204). Accordingly, wear-leveling process 10 may allow for the equitable distribution of failed erase-blocks amongst the various LUNs included within physical memory device 200.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   dividing a physical memory device into at least a first logical memory device and a second logical memory device, wherein the physical memory device includes a plurality of physical memory elements;
   assigning a first portion of the plurality of physical memory elements to the first logical memory device;
   assigning a second portion of the plurality of physical memory elements to the second logical memory device; and
   trading a first physical memory element included within the first portion of the plurality of physical memory elements with a second physical memory element included within the second portion of the plurality of physical memory elements to promote wear leveling across the physical memory device;
   wherein the plurality of physical memory elements is a plurality of physical erase-blocks, wherein the first logical memory device pre-erases physical erase-blocks as needed independent of a number of pre-erased physical erase-blocks within the second logical memory device.

2. The computer-implemented method of claim 1 wherein:
   one or more of the first physical memory element and the second physical memory element are chosen from the group consisting of: a high-wear functioning physical memory element, a low-wear functioning physical memory element, and a failed physical memory element.

3. The computer-implemented method of claim 1 wherein dividing the physical memory device further includes:
   dividing the physical memory device into at least a third logical memory device; and
   assigning an additional portion of the plurality of physical memory elements to at least the third logical memory device.

4. The computer-implemented method of claim 1 wherein: the physical memory device is a flash memory device.

5. The computer-implemented method of claim 1 wherein: the physical erase-block includes a plurality of physical memory pages.

6. The computer-implemented method of claim 1 wherein:
   trading a first physical memory element included within the first portion of the plurality of physical memory elements with a second physical memory element included within the second portion of the plurality of physical memory elements further comprises maintaining an original quantity of physical memory elements within each of the logical memory devices.

7. A computer program product residing on a non-transitory computer readable medium having a plurality of instructions stored thereon which, when executed by a processor, cause the processor to perform operations comprising:
   dividing a physical memory device into at least a first logical memory device and a second logical memory device, wherein the physical memory device includes a plurality of physical memory elements;
   assigning a first portion of the plurality of physical memory elements to the first logical memory device;
   assigning a second portion of the plurality of physical memory elements to the second logical memory device; and
   trading a first physical memory element included within the first portion of the plurality of physical memory elements with a second physical memory element included within the second portion of the plurality of physical memory elements to promote wear leveling across the physical memory device;
   wherein the plurality of physical memory elements is a plurality of physical erase-blocks, wherein the first logical memory device pre-erases physical erase-blocks as needed independent of a number of pre-erased physical erase-blocks within the second logical memory device.

8. The computer program product of claim 7 wherein:
   one or more of the first physical memory element and the second physical memory element are chosen from the group consisting of: a high-wear functioning physical memory element, a low-wear functioning physical memory element, and a failed physical memory element.

9. The computer program product of claim 7 wherein the instructions for dividing the physical memory device further include:
   dividing the physical memory device into at least a third logical memory device; and
   assigning an additional portion of the plurality of physical memory elements to at least the third logical memory device.

10. The computer program product of claim 7 wherein: the physical memory device is a flash memory device.

11. The computer program product of claim 7 wherein: the physical erase-block includes a plurality of physical memory pages.

12. The computer program product of claim 7 wherein:
    trading a first physical memory element included within the first portion of the plurality of physical memory elements with a second physical memory element included within the second portion of the plurality of physical memory elements further comprises maintaining an original quantity of physical memory elements within each of the logical memory devices.

13. A computing system comprising:
    at least one processor;
    at least one memory architecture coupled with the at least one processor; and
    one or more software modules executed by the at least one processor, wherein the one or more software modules are configured to perform operations including:
    dividing a physical memory device into at least a first logical memory device and a second logical memory device, wherein the physical memory device includes a plurality of physical memory elements;
    assigning a first portion of the plurality of physical memory elements to the first logical memory device;

assigning a second portion of the plurality of physical memory elements to the second logical memory device; and trading a first physical memory element included within the first portion of the plurality of physical memory elements with a second physical memory element included within the second portion of the plurality of physical memory elements to promote wear leveling across the physical memory device;

wherein the plurality of physical memory elements is a plurality of physical erase-blocks, wherein the first logical memory device pre-erases physical erase-blocks as needed independent of a number of pre-erased physical erase-blocks within the second logical memory device.

14. The computing system of claim 13 wherein:

one or more of the first physical memory element and the second physical memory element are chosen from the group consisting of: a high-wear functioning physical memory element, a low-wear functioning physical memory element, and a failed physical memory element.

15. The computing system of claim 13 wherein dividing the physical memory device further includes:

dividing the physical memory device into at least a third logical memory device; and assigning an additional portion of the plurality of physical memory elements to at least the third logical memory device.

16. The computing system of claim 13 wherein:

the physical memory device is a flash memory device.

17. The computing system of claim 13 wherein:

the physical erase-block includes a plurality of physical memory pages.

18. The computing system of claim 13 wherein:

trading a first physical memory element included within the first portion of the plurality of physical memory elements with a second physical memory element included within the second portion of the plurality of physical memory elements further comprises maintaining an original quantity of physical memory elements within each of the logical memory devices.

* * * * *